(12) United States Patent
Stokes et al.

(10) Patent No.: US 9,385,403 B2
(45) Date of Patent: Jul. 5, 2016

(54) BATTERY PACK

(75) Inventors: Robert M. Stokes, The Colony, TX (US); Timothy M. Friebel, Lewisville, TX (US)

(73) Assignee: Raytheon Company, Waltham, MA (US)

( * ) Notice: Subject to any disclaimer, the term of this patent is extended or adjusted under 35 U.S.C. 154(b) by 1323 days.

(21) Appl. No.: 12/941,513

(22) Filed: Nov. 8, 2010

(65) Prior Publication Data

US 2012/0114983 A1    May 10, 2012

(51) Int. Cl.
| | |
|---|---|
| *H01M 10/48* | (2006.01) |
| *H01M 2/10* | (2006.01) |
| *H01M 2/20* | (2006.01) |
| *H01M 10/42* | (2006.01) |

(52) U.S. Cl.
CPC .......... *H01M 10/488* (2013.01); *H01M 2/1022* (2013.01); *H01M 2/20* (2013.01); *H01M 10/4207* (2013.01); *H01M 2/105* (2013.01)

(58) Field of Classification Search
CPC ... H01M 2/04–2/0421; H01M 2/0456–2/0465; H01M 2/10–2/1055
See application file for complete search history.

(56) References Cited

U.S. PATENT DOCUMENTS

| | | | |
|---|---|---|---|
| 5,347,163 A * | 9/1994 | Yoshimura | G11C 5/141 307/150 |
| 5,777,715 A * | 7/1998 | Kruegle et al. | 351/158 |
| 6,141,223 A * | 10/2000 | Fukushima | H01M 2/1055 200/17 R |
| 6,641,432 B1 * | 11/2003 | Ouyoung | 439/500 |
| 7,183,014 B2 | 2/2007 | Sasaki et al. | |
| 7,236,356 B2 | 6/2007 | Ulla et al. | |
| 7,288,337 B2 | 10/2007 | Kim | |
| 7,339,348 B2 | 3/2008 | Bui et al. | |
| 7,635,535 B2 | 12/2009 | Ebi et al. | |
| 7,728,549 B2 | 6/2010 | Bartlett et al. | |
| 7,825,636 B2 | 11/2010 | Partin et al. | |
| 2002/0017895 A1 * | 2/2002 | Kawashima | 320/118 |
| 2007/0126538 A1 * | 6/2007 | Liu | 335/172 |
| 2007/0273983 A1 * | 11/2007 | Hebert | 359/708 |
| 2007/0298319 A1 * | 12/2007 | Barwick | 429/100 |
| 2008/0292947 A1 * | 11/2008 | Scherrer | 429/97 |
| 2010/0221594 A1 * | 9/2010 | Ro kamp et al. | 429/100 |

OTHER PUBLICATIONS

U.S. Appl. No. 61/319,646 entitled "Battery Pack", inventor Lee R. Hinze, 14 pages, filed Mar. 31, 2010.

* cited by examiner

*Primary Examiner* — Jonathan Crepeau
*Assistant Examiner* — Jacob Buchanan

(57) ABSTRACT

In certain embodiments, an apparatus comprises a battery housing and mechanical switches. The battery housing is configured to house one or more batteries and comprises a connector configured to provide current to a device. A surface of the battery housing forms slots, where each slot is configured to receive a battery. Each mechanical switch is coupled to a slot and is configured to allow current from the battery to flow to the connector if a battery is received in the slot, and to pass current through the slot if a battery is not received in the slot.

21 Claims, 5 Drawing Sheets

ND TECHNICAL FIELD

This invention relates generally to the field of power source systems and more specifically to battery packs.

BACKGROUND

Batteries provide electrical energy to, for example, electrical devices. Typically, batteries may be housed in a battery pack that may be coupled to an electrical device in order to provide energy to the device.

Different types of electrical devices may require energy from different types and numbers of batteries.

SUMMARY OF THE DISCLOSURE

In accordance with the present invention, disadvantages and problems associated with previous techniques for housing batteries may be reduced or eliminated.

In certain embodiments, an apparatus comprises a battery housing and mechanical or electrical switches. The battery housing is configured to house one or more batteries and comprises a connector configured to provide current to a device. A surface of the battery housing forms slots, where each slot is configured to receive a battery. Each mechanical switch is coupled to a slot and is configured to allow current from the battery to flow to the connector if a battery is received in the slot, and to pass current through the slot if a battery is not received in the slot.

Certain embodiments of the invention may provide one or more technical advantages. A technical advantage of one embodiment may be that a battery pack may have a number N of slots and may be configured to provide electrical energy from one to N batteries. Each slot may be configured to place a battery in series with the other batteries only if the slot contains the battery. Another technical advantage of one embodiment may be that the battery pack may be coupled to any suitable external device in order to provide energy to the device. Different external devices may require a different number of batteries. The battery pack may be filled with the appropriate number of batteries in order to provide energy to the external device.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 7 of the drawings, like numerals being used for like and corresponding parts of the various drawings.

Figure 1:
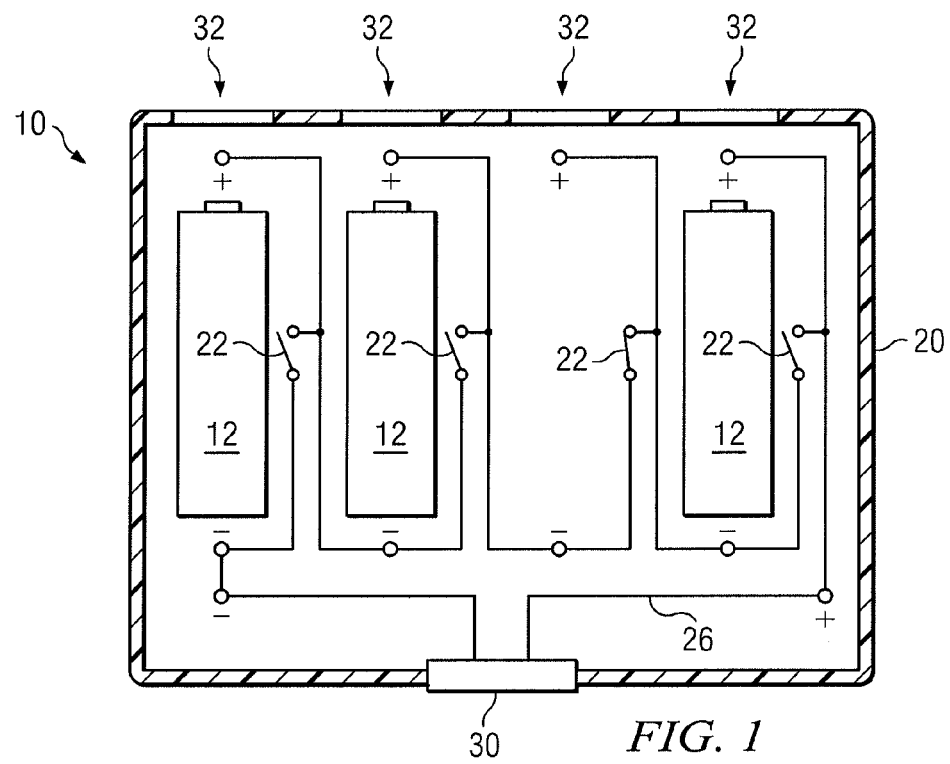
FIG. 1 illustrates an example of a battery pack that may be used to house one or more batteries.

FIG. 1 illustrates an example of a battery pack 10 that may be used to house one or more batteries 12. In the example, battery pack 10 includes a battery housing 20, two or more mechanical and/or electrical switches 22, one or more wires 26, and a connector 30 coupled as shown. Battery housing 20 is configured to house one or more batteries 12 and comprises connector 30 configured to provide current to a device. A surface of battery housing 20 forms slots 32, where each slot 32 is configured to receive a battery 12. Each switch is coupled to a slot 32 and is configured to: if a battery is received in the slot 32, provide current from the battery to the connector; otherwise, pass current through slot 32.

In certain embodiments, batteries 12 provide electrical energy to, for example, electrical devices. An electrical battery 12 includes two or more electrochemical cells that convert stored chemical energy into electrical energy. Batteries 12 may include any type of batteries, such as primary (disposable) and/or secondary (rechargeable) batteries. Batteries 12 may include any size of batteries, such as AA, AAA, 123, C, D, 9-volt, camcorder, and/or cordless phone batteries.

Battery housing 20 houses one or more batteries 12. Battery housing 20 may comprise any suitable rigid material, for example, plastic and/or metal. Battery housing 20 may have any suitable size and shape. For example, battery housing 20 may have a size and shape that can accommodate the maximum number of batteries 12 to be housed by battery pack 10.

In certain embodiments, battery housing 20 comprises a battery carrier 40 and a battery container 42. Battery carrier 40 may have two or more slots 32, where each slot 32 may receive a battery 12. Wires 26 may electrically couple slots in series as illustrated. Wires 26 may comprise any suitable conductive material, for example, a metal such as copper.

In the illustrated example, each slot 32 of at least a subset of the slots 32 has a corresponding switch 22. A switch 22 opens if corresponding slot 32 has received a battery 12. If switch 22 is open, battery 12 is placed in series with other batteries 12 received in other slots 32 and provides current to connector 30. If there are no other batteries, battery 12 provides current to connector 30. A switch 22 closes if the corresponding slot 32 has not received a battery 12. A closed switch 22 passes current through the slot 32 as illustrated. Examples of battery carrier 40 and battery container 42 are described in more detail with reference to FIGS. 2 through 5.

Switches 22 may comprise any suitable switches, such as mechanical switches, electrical switches, or a combination of mechanical and electrical switches. Examples of switches 22 are described in more detail with reference to FIG. 4.

Connector 30 electrically couples batteries 12 to an external device in order to provide current from batteries 12 to the external device. An example of connector 30 is described in more detail with reference to FIG. 5. Examples of external devices are described in more detail with reference to FIGS. 6 and 7.

Figure 2:
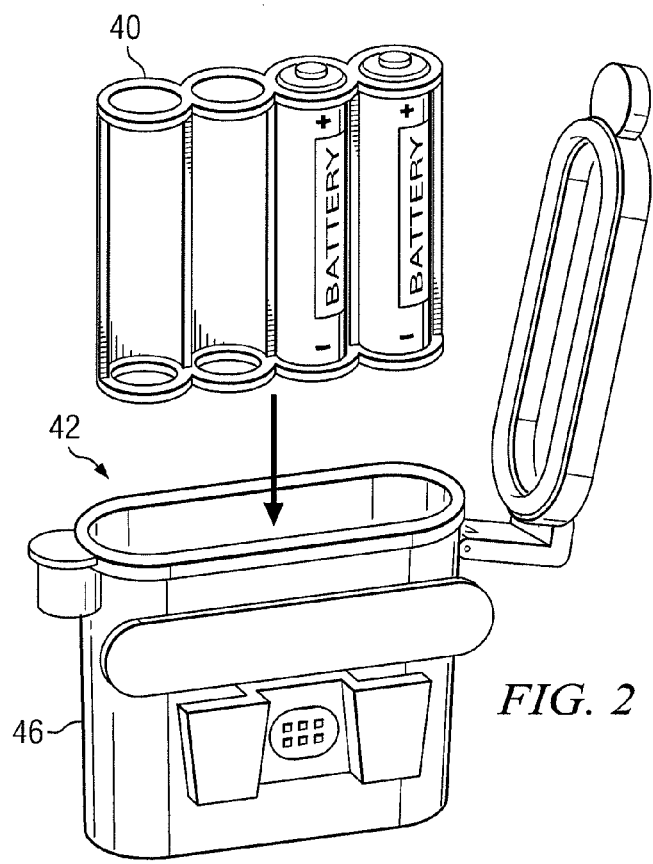
FIG. 2 illustrates an example of a battery housing that comprises a battery carrier and a battery container.

FIG. 2 illustrates an example of battery housing that comprises battery carrier 40 and battery container 42. In certain embodiments, battery housing 20 comprises a battery carrier 40 and a battery container 42. In the illustrated example, battery carrier 40 and battery container 42 are separate components. Battery carrier 40 has a surface that forms slots 32, and can be removably coupled to battery container 42. For example, battery container 42 has a vessel 46 configured to receive battery carrier 40 such that battery carrier 40 may be inserted into vessel 46. In this example, batteries 12 may be first placed into battery carrier 40, and then battery carrier 40 may be placed into battery container 42.

In other examples, battery carrier 40 and battery container 42 are one component. In certain examples, the interior portion of vessel 46 may be regarded as battery carrier 40 having the surface that forms slots 32, and the exterior portion may be regarded as battery container 42. In this example, batteries 12 may be inserted directly into slots 32 of the interior portion of vessel 46.

Figure 3:
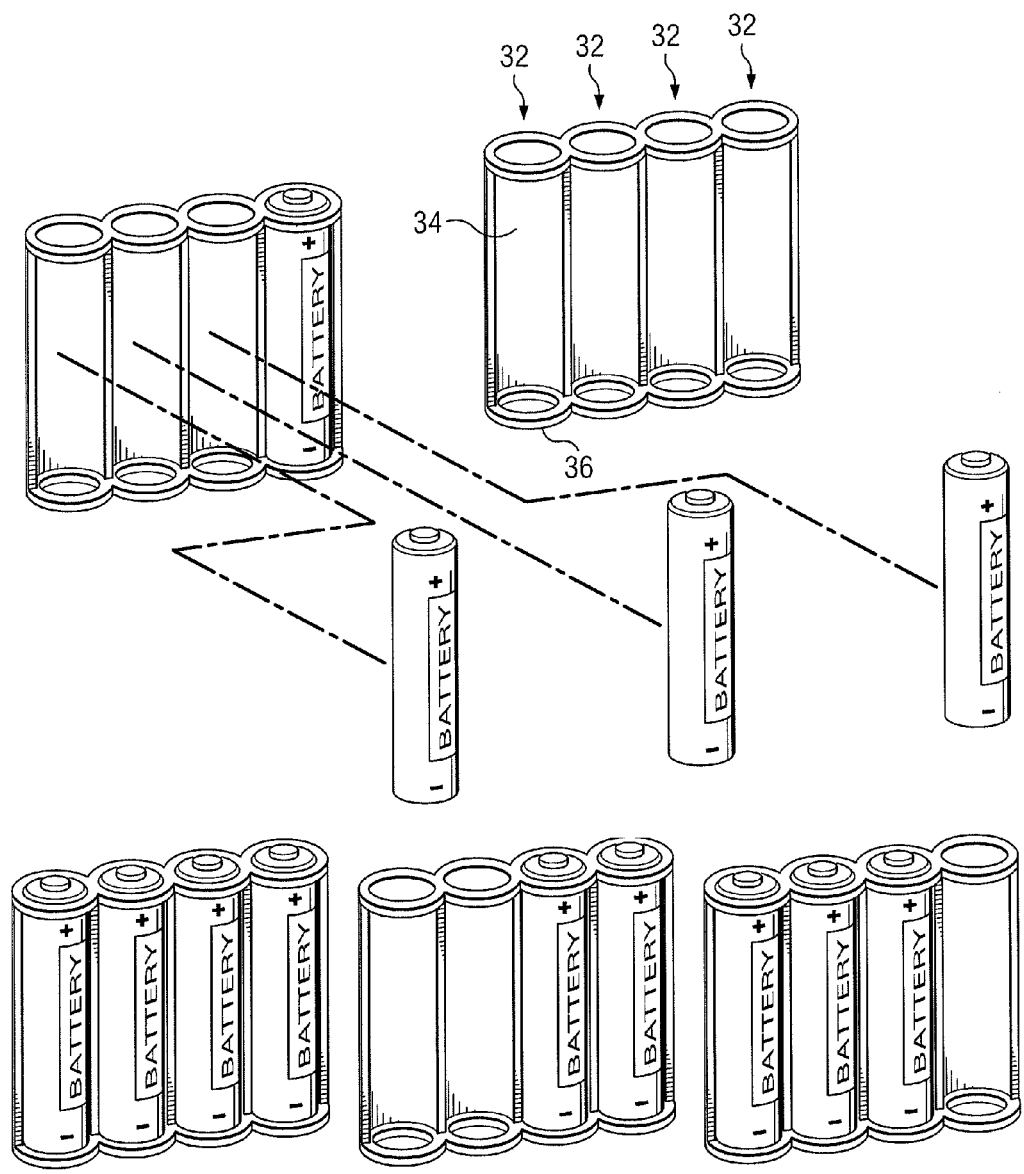
FIG. 3 illustrates an example of a battery carrier.

FIG. 3 illustrates an example of battery carrier 40. Battery carrier 40 may have any suitable number of slots 32, for example, 2, 3, 4, or more than 4 slots 32. Slots 32 may be arranged in any suitable manner. For example, batteries 12 may be arranged in one row as illustrated. As another example, batteries 12 may be arranged in two or more rows. As another example, batteries 12 may be arranged in a circle or in concentric circles.

A slot 32 may be shaped to receive a battery 12. Slot 32 may have a size and shape similar to that of the negative space of battery 12 in order to receive battery 12. Slot 32 may have an opening through which battery 12 may be inserted. Slot 32 may have a shape and/or restraint 34 that holds battery 12 in place.

Figure 4A:
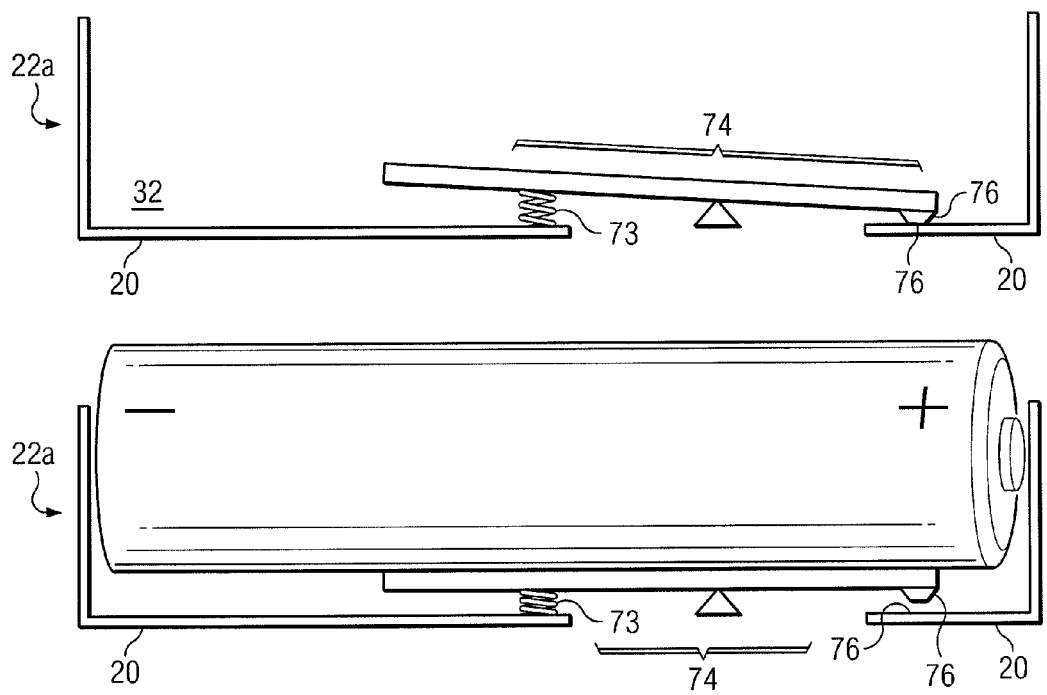
FIGS. 4A and 4B illustrate examples of mechanical and electrical switches.

FIG. 4A illustrates an example of a mechanical switch 22a. In certain embodiments, if a battery is received in a slot, mechanical switch 22a of the slot opens to allow current from the battery to flow to connector 30. Otherwise, mechanical switch 22a closes to pass current through the slot.

In the example, mechanical switch 22a comprises a spring-loaded mechanical shorting lever switch that includes a spring 73, a lever 74, and contacts 76. If slot 32 is empty, spring 73 makes contacts 76 short together. If slot 32 holds a battery, the battery moves lever 74, which opens contacts 76 prior to the battery connecting to the contacts 76.

Figure 4B:
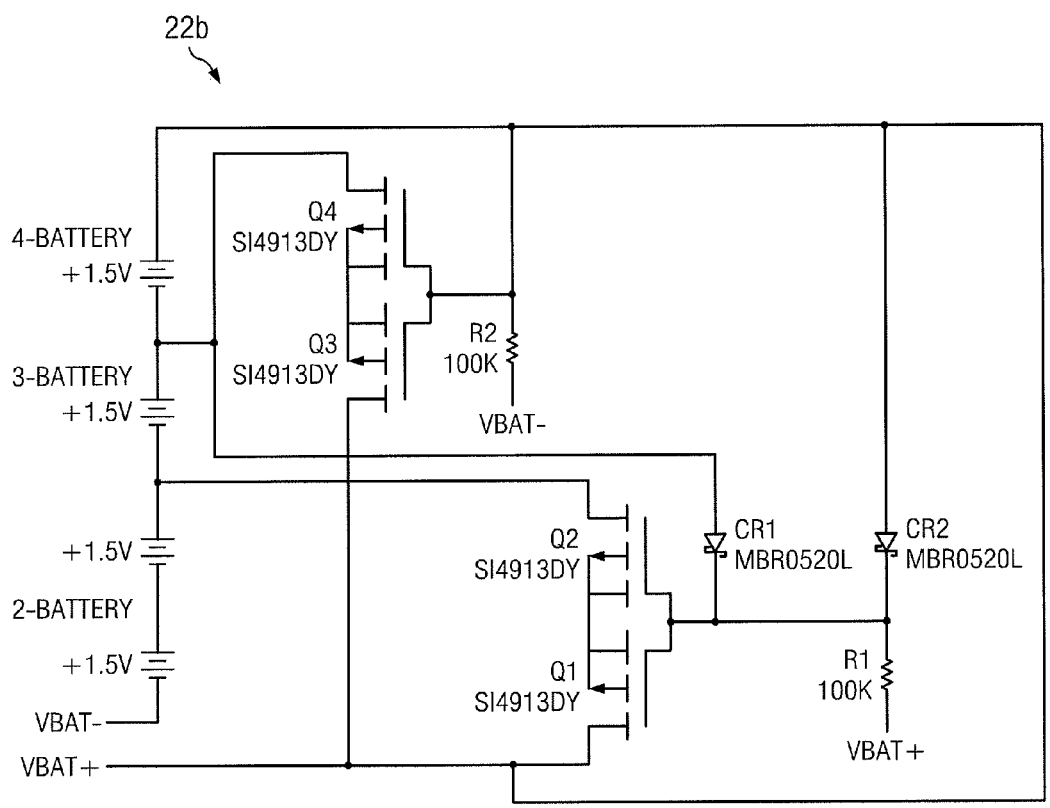

FIG. 4B illustrates an example of an electrical switch 22b. In certain embodiments, if a live battery terminal is detected in a slot, electrical switch 22b of the slot allows current from the battery to flow to connector 30. Otherwise, electrical switch 22b passes current through the slot.

In the example, electrical switch 22b comprises a field-effect transistor (FET) circuit. In certain embodiments, switch 22b monitors battery contacts to detect live battery terminals. The FET circuit may automatically switch battery voltage VBAT+ to the live battery terminals. If two or more batteries are used, batteries may be inserted into specific slots based on the number of batteries. For example, if two batteries are used, certain slots may be used for the two batteries. In certain embodiments, the FET circuit may use a continuous current draw on the order of 50 to 100 µA for two or more batteries.

Figure 5:
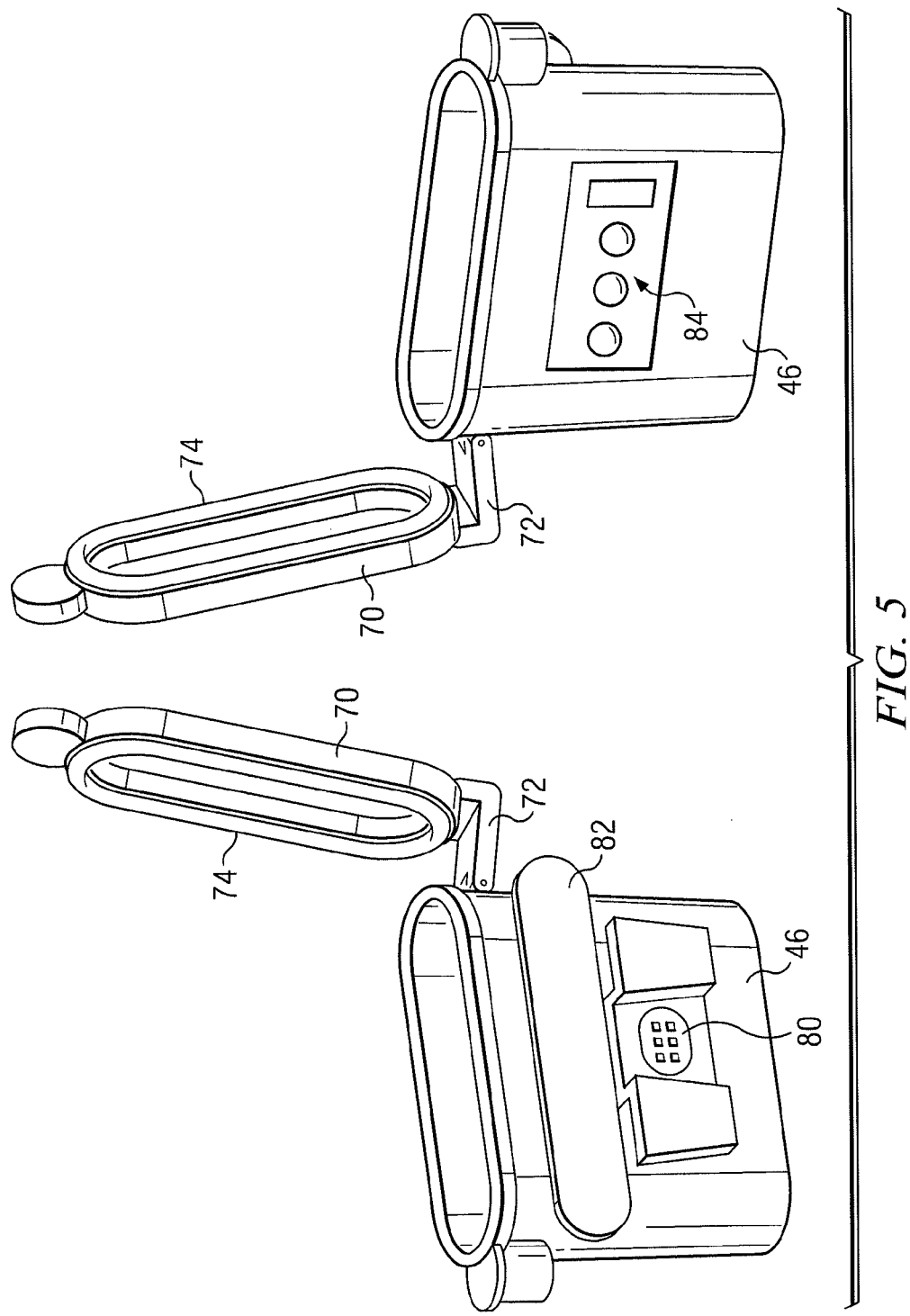
FIG. 5 illustrates an example of a battery container.

FIG. 5 illustrates an example of battery container 42. In the example, battery container 42 comprises vessel 46, a lid 70, a hinge 72, a seal 74, a connector 80, a latch/release 82, and/or indicators 84 coupled and/or arranged as shown. In the example, vessel 46 is configured to receive batteries 12. In certain examples, vessel 46 and battery container 42 are separate components. In other examples, vessel 46 and battery container 42 are one component.

In the example, lid 70 is configured to removably couple to vessel 46 to reduce passage of external substances into vessel 46. For example, lid 70 may prevent passage of air, fluid, and/or solids into vessel 46. Seal 74 may be coupled to lid 70 and/or vessel 46 in order to better reduce passage of external substances. Hinge 72 may be used to couple lid 70 to vessel 46.

Connector 80 comprises a contact (such as a metal contact) that may be used to transmit current from batteries 12 to an external device. In the example, connector 80 comprises a hot shoe connector. A hot shoe connector may have an adapter that is shaped to receive and be coupled to a matching adapter of an external device. For example, the hot shoe connector adapter may be shaped like an inverted, squared-off "U". The external device adapter slides in the U shape. A clamping screw may secure the adapters together. Latch/release 82 may be used to couple and/or decouple battery pack 10 from an external device.

One or more indicators 84 may be used to provide the status of batteries 12. Examples of indicators 84 include a remaining power indicator, a usage indicator, and a battery power indicator. A remaining power indicator may indicate the remaining power of batteries 12. A usage indicator may indicate how much power of batteries 12 have been used. A battery power indicator may indicate the amount of battery power of batteries 12 that is available.

Figure 6:
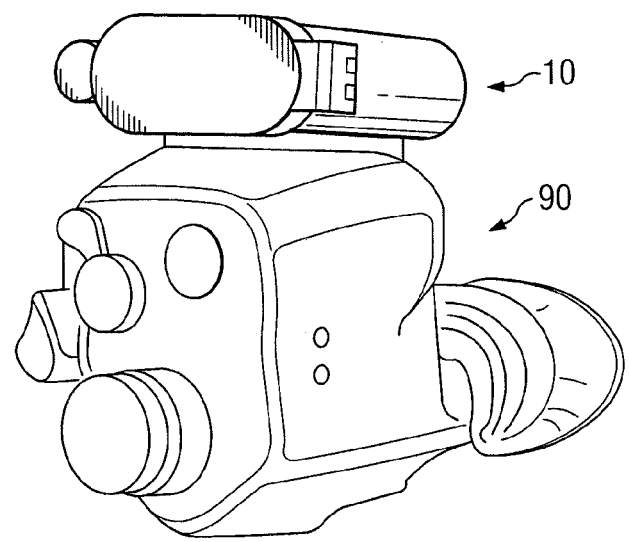
FIG. 6 illustrates an example of a battery pack coupled to an imaging system.

FIG. 6 illustrates an example of battery pack 10 coupled to an imaging system 90. Imaging system 90 may generate an image of an object. Examples of imaging systems include cameras, night vision systems, video cameras, medical imaging devices, and radar imaging systems.

Figure 7:
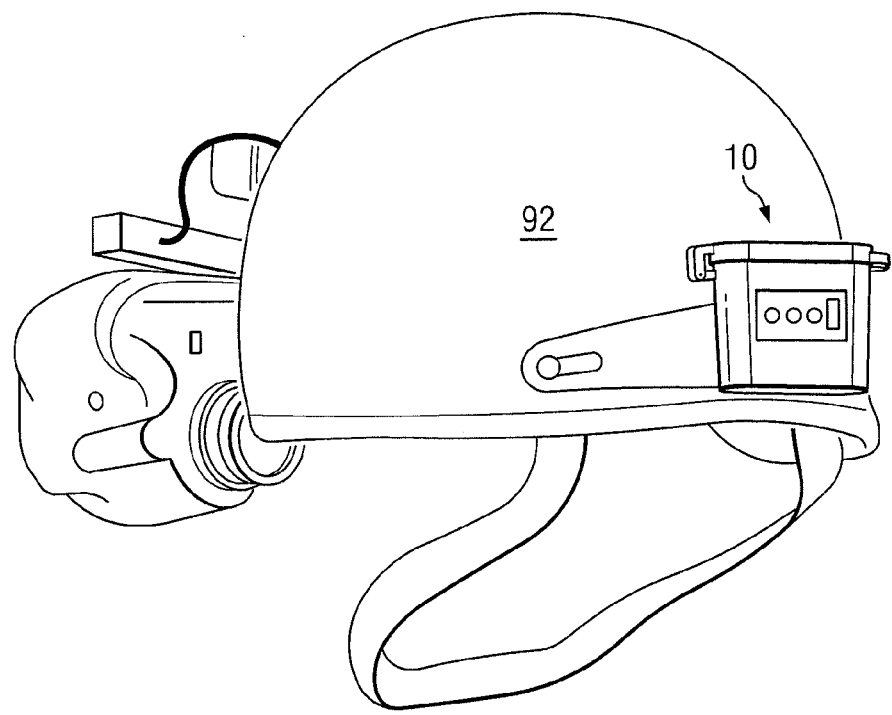
FIG. 7 illustrates an example of a battery pack coupled to a helmet.

FIG. 7 illustrates an example of battery pack 10 coupled to a helmet 92. Helmet 92 may have a connector that connects current from battery pack to devices mounted on helmet 92. Devices mounted to helmet 92 may include, for example, imaging systems.

Modifications, additions, or omissions may be made to the systems and apparatuses disclosed herein without departing from the scope of the invention. The components of the systems and apparatuses may be integrated or separated. For example, battery carrier 40 and battery container 42 may be the same component or may be separate components. Moreover, the operations of the systems and apparatuses may be performed by more, fewer, or other components. For example, the operations of vessel 46 and battery carrier 40 may be performed by one component, or the operations of battery housing 40 may be performed by more than one component. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. An apparatus comprising:
   a battery housing configured to house multiple batteries, the battery housing comprising a connector configured to provide current to a device, a surface of the battery housing forming a plurality of slots, each slot configured to receive at least one of the batteries; and
a plurality of switches, each switch associated with one of the slots and configured to:
when at least one of the batteries is present in the associated slot, allow current from the at least one battery to flow to the connector; and
when the associated slot is empty, pass current through the associated slot;
wherein the plurality of switches includes at least one switch that is a spring-loaded mechanical shorting lever switch comprising a lever pivotable about a fulcrum, a spring, and a contact, wherein the fulcrum, the spring, and the contact are disposed on a same surface of the lever;
wherein, when the slot associated with the spring-loaded mechanical shorting lever switch is empty, a decompression force of the spring against the lever and against the housing causes the contact and the battery housing to physically touch and electrically short together; and
wherein, when at least one of the batteries is present in the slot associated with the spring-loaded mechanical shorting lever switch, the at least one battery and the lever physically separate the contact from the battery housing to open the spring-loaded mechanical shorting lever switch by compressing the spring.

2. The apparatus of claim 1, wherein the battery housing comprises:
a battery carrier having the surface forming the plurality of slots; and
a battery container comprising a vessel configured to receive the battery carrier.

3. The apparatus of claim 1, wherein the battery housing comprises:
a battery carrier having the surface forming the plurality of slots; and
a battery container removably coupled to the battery carrier.

4. The apparatus of claim 1, wherein the battery housing comprises:
a vessel having the surface forming the plurality of slots.

5. The apparatus of claim 1, wherein the battery housing comprises:
a vessel configured to receive the batteries; and
a lid configured to removably couple to the vessel to reduce passage of an external substance into the vessel.

6. The apparatus of claim 1, wherein at least one of the plurality of switches comprises a mechanical switch configured to selectively (i) open to allow current from at least one of the batteries to flow to the connector and (ii) close to pass current.

7. The apparatus of claim 1, wherein at least one other switch of the plurality of switches comprises an electrical switch configured to selectively (i) allow current from at least one of the batteries to flow to the connector and (ii) pass current.

8. The apparatus of claim 1, wherein the connector comprises a hot shoe connector.

9. The apparatus of claim 1, wherein each switch in the plurality of switches comprises a spring-loaded mechanical shorting lever switch.

10. A method comprising:
receiving multiple batteries in a plurality of slots of a battery housing, each slot configured to receive at least one of the batteries and having a switch, the battery housing comprising a connector configured to provide current to a device; and
for each switch:
when at least one of the batteries is present in the associated slot, allowing current from the at least one battery to flow to the connector using the switch; and
when the associated slot is empty, passing current through the associated slot using the switch;
wherein the plurality of switches includes at least one switch that is a spring-loaded mechanical shorting lever switch comprising a lever pivotable about a fulcrum, a spring, and a contact, wherein the fulcrum, the spring, and the contact are disposed on a same surface of the lever;
wherein, when the slot associated with the spring-loaded mechanical shorting lever switch is empty, a decompression force of the spring against the lever and against the housing causes the contact and the battery housing to physically touch and electrically short together; and
wherein, when at least one of the batteries is present in the slot associated with the spring-loaded mechanical shorting lever switch, the at least one battery and the lever physically separate the contact from the battery housing to open the spring-loaded mechanical shorting lever switch by compressing the spring.

11. The method of claim 10, further comprising:
providing the current from the batteries to the device.

12. The method of claim 10, wherein receiving the batteries comprises:
receiving the batteries into a battery carrier of the battery housing; and
receiving the battery carrier into a battery container of the battery housing.

13. The method of claim 10, wherein receiving the batteries comprises:
receiving the batteries into a vessel of the battery housing; and
reducing passage of an external substance into the vessel using a lid.

14. The method of claim 10, wherein, for at least one of the plurality of switches:
allowing the current from at least one of the batteries to flow to the connector comprises opening a mechanical switch to allow current from the at least one battery to flow to the connector; and
passing the current through one of the slots comprises closing the mechanical switch to pass current through the slot.

15. The method of claim 10, wherein, for at least one of the plurality of switches, allowing the current from at least one of the batteries to flow to the connector and passing the current through one of the slots comprise:
when a live battery terminal is detected in one of the slots, allowing the current from the at least one battery to flow to the connector; and
when a live battery terminal is not detected in one of the slots, passing current through the slot.

16. An apparatus comprising:
a battery housing configured to house multiple batteries, the battery housing comprising a connector configured to provide current to a device, a surface of the battery housing forming a plurality of slots, each slot configured to receive at least one of the batteries, the battery housing comprising:
a battery carrier having the surface forming the plurality of slots;
a battery container comprising a vessel configured to receive the battery carrier; and a lid configured to removably couple to the vessel to reduce passage of an external substance into the vessel; and a plurality of switches, each switch associated with one of the slots and configured to:
when at least one of the batteries is present in the associated slot, allow current from the at least one battery to flow to the connector; and
when the associated slot is empty, pass current through the associated slot;

wherein the plurality of switches includes at least one switch that is a spring-loaded mechanical shorting lever switch comprising a lever pivotable about a fulcrum, a spring, and a contact, wherein the fulcrum, the spring, and the contact are disposed on a same surface of the lever;

wherein, when the slot associated with the spring-loaded mechanical shorting lever switch is empty, a decompression force of the spring against the lever and against the housing causes the contact and the battery housing to physically touch and electrically short together; and wherein, when at least one of the batteries is present in the slot associated with the spring-loaded mechanical shorting lever switch, the at least one battery and the lever physically separate the contact from the battery housing to open the spring-loaded mechanical shorting lever switch by compressing the spring.

17. The apparatus of claim 16, wherein at least one of the plurality of switches comprises a mechanical switch configured to selectively (i) open to allow current from at least one of the batteries to flow to the connector and (ii) close to pass current.

18. The apparatus of claim 16, wherein at least one other switch of the plurality of switches comprises an electrical switch configured to selectively (i) allow current from at least one of the batteries to flow to the connector and (ii) pass current.

19. The apparatus of claim 16, wherein the connector comprises a hot shoe connector.

20. The apparatus of claim 16, wherein the connector is configured to be coupled to an imaging system.

21. The apparatus of claim 16, wherein the connector is configured to be coupled to a helmet.

* * * * *